United States Patent [19]

Knippschild et al.

[11] 4,410,444

[45] Oct. 18, 1983

[54] PROCESS FOR THE PRODUCTION OF A STABLE PER SALT

[75] Inventors: Gerd Knippschild; Hans Klebe, both of Rheinfelden; Hubert Schuster, Karsau-Beuggen, all of Fed. Rep. of Germany

[73] Assignee: Degussa Aktiengesellschaft, Frankfurt am Main, Fed. Rep. of Germany

[21] Appl. No.: 246,947

[22] Filed: Mar. 24, 1981

[51] Int. Cl.$^3$ ............... C01B 13/00; C01B 15/00
[52] U.S. Cl. .................... 252/186.21; 252/186.25
[58] Field of Search .............. 252/186, 186.21, 186.25

[56] References Cited

U.S. PATENT DOCUMENTS

| | | | |
|---|---|---|---|
| 3,979,318 | 9/1976 | Tokiwa et al. | 252/186 |
| 4,075,116 | 2/1978 | Mesaros | 252/186 |
| 4,156,039 | 5/1979 | Klebe et al. | 252/186 |
| 4,178,351 | 12/1979 | Klebe et al. | 252/186 |
| 4,179,394 | 12/1979 | Dillenburg et al. | 252/186 |
| 4,194,025 | 3/1980 | Klebe et al. | 252/186 |

FOREIGN PATENT DOCUMENTS

| | | |
|---|---|---|
| 2060971 | 7/1971 | Fed. Rep. of Germany . |
| 2250720 | 5/1973 | Fed. Rep. of Germany . |
| 2733935 | 2/1978 | Fed. Rep. of Germany . |
| 2076430 | 9/1971 | France . |
| 174891 | 1/1927 | United Kingdom . |

*Primary Examiner*—Allan Lieberman
*Attorney, Agent, or Firm*—Cushman, Darby & Cushman

[57] ABSTRACT

There is produced a stabile per salt which contains simultaneously sodium percarbonate and sodium perborate by introducing a solution supersaturated with both sodium percarbonate and sodium perborate to nuclei which consist of sodium percarbonate and/or sodium perborate.

6 Claims, No Drawings

PROCESS FOR THE PRODUCTION OF A STABLE PER SALT

BACKGROUND OF THE INVENTION

The industrially most important known per salts are sodium percarbonate and sodium perborate which are employed in washing agents.

While sodium percarbonate is readily soluble but not very storage stabile, the reverse for sodium perborate (hereinafter unless otherwise indicated there is always understood the tetrahydrate) which is very difficultly soluble but instead is substantially safer to store. Also sodium perborate is more abrasion resistant than sodium percarbonate.

In order for the sodium percarbonate to approach the storage stabiliy and abrasion resistance of sodium perborate there have already been many proposals.

Thus silica in the form of sodium silicate was added to the sodium percarbonate which was formed both from solid soda and more preferably from aqueous soda solutions by reaction with hydrogen peroxide, see British Pat. No. 174,891.

However, the stability was not substantially improved by the simple mixing.

Also the use of a fluidized bed which consists of soda particles on which aqueous hydrogen peroxide was sprayed was not successful, see French Pat. No. 2,076,430.

Therefore, the art has already gone to producing sodium percarbonate by spraying a sodium percarbonate suspension or solutions of hydrogen peroxide and soda on nuclei already present. In that case, these nuclei can consist of sodium percarbonate or also of another per salt, as e.g. sodium perborate.

However, this process has prove to be difficult to carry out industrially since either a premature crystallization takes place in the injection nozzle or an inhomogeneous product is formed according to German OS 2,060,971.

By the impregnation of the percarbonate nuclei with the two aqueous solutions of hydrogen peroxide and sodium carbonate before introduction into a fluidized bed dryer to be sure homogeneous particles are formed, but besides other constituted technical difficulties in the carrying out of this process, the thus obtained percarbonate particles also were not stabile enough, see German OS 2,250,720.

To be sure these disadvantages are supposed to be overcome by the process of German OS 2,733,935 in which namely a condensed phosphate of an alkali metal, such as e.g., sodium hexametaphosphate is present during the impregnation of the nuclei, which then themselves are freed from water in a fluidized bed dryer, but the simultaneous addition of this sodium percarbonate together with sodium perborate in a washing agent mixture requires first the production of the sodium percarbonate according to German OS 2,733,935 and additionally the separate production of sodium perborate according to known processes.

Thus previously there must always be carried out two separate processes of production if two materials are to be introduced into a washing agent either separately or as a common product, e.g. according to German OS 2,060,971.

The object of the application therefore is the development of a process according to which a per salt is producible in a single step which is more readily soluble than sodium perborate and has a higher active oxygen content than this.

SUMMARY OF THE INVENTION

It has now been found that a per salt can be produced in a single step that is more readily water soluble and has a higher active oxygen content than sodium perborate if sodium perborate and/or sodium percarbonate containing nuclei are brought together with an aqueous solution which is supersaturated in sodium percarbonate and sodium perborate and besides contains both sodium silicate and sodium hexametaphosphate.

The total content of dissolved solids is between 20–40 weight %, preferably 25–35 weight % based on the aqueous solution.

Within these solids boundaries, the portion of sodium percarbonate and sodium perborate in the solution can be varied as desired. Above 40 weight % the solution is scarcely still sprayable, below 20 weight % it is uneconomical to operate because too much water must be vaporized.

The amount of hydrogen peroxide must be at least sufficient for the formation of the two active oxygen carriers. The upper limit on the hydrogen peroxide is not critical. There can be used commercial aqueous solutions, preferably solutions of 50–70 weight % $H_2O_2$.

The portions of the individual materials in the aqueous solution employed in the invention amount to, based on the dissolved solid portion 5 to 60 weight % sodium carbonate as $Na_2CO_3.1.5H_2O$; 1 to 20 weight % $B_2O_3$ as $NaBO_2.3H_2O.H_2O_2$; 0.05 to 5 weight % $SiO_2$ as sodium silicate and 0.01 to 5 weight % $P_2O_5$ as sodium hexametaphosphate.

Those skilled in the art until now had the view that a solution which simultaneously contained sodium percarbonate and sodium perborate would not be usable industrially since as is known sodium percarbonate as the more readily soluble component should cause salting out on the more difficultly soluble sodium perborate.

Therefore it was surprising that in spite thereof a solution of this type was producible and usable according to the process of the invention. This solution is produced as follows.

The aqueous solution to be mixed with the already present nuclei consists of two separate solutions. The solution I contains the components: soda and sodium metaborate corresponding to the ratios selected of the percarbonate to perborate, as well as the stabilizer sodium silicate, preferably as a waterglass solution of 38° Bé and the sodium hexametaphosphate needed to breakdown the supersaturation of sodium percarbonate.

The solution II contains the equivalent amount of hydrogen peroxide, preferably as a 50–70 weight % solution, that is calculated for the quantitative change of the previously given amount of soda to sodium percarbonate. A slight excess of hydrogen peroxide of 10 weight % over the equivalent amount is advisable.

The mixture of solutions I and II must begin so far before the inlet in the spraying unit that the mixed solution is present homogeneously at the entrances; however, the mixing must not be entered so far from the spraying unit that precipitation begins already. This can be established by a preliminary test.

PREPARATION OF SOLUTION I
(ILLUSTRATIVE EXAMPLE)

There was first dissolved in an amount of water sufficient for the production of a clear solution sodium hexametaphosphate and subsequently the required amount of soda. The amount of water is besides sufficient according to the established ratio of "percarbonate to perborate" as well as to dissolve the corresponding amount of sodium metaborate, preferably in the form of caustic soda and crystalline $Na_2B_4O_7.10H_2O$. To this solution was then added the previously established amount of waterglass 38° Bé. The amount of solids can be determined in a simple manner by weighing the solids to be added, the amount of water and the finished solution.

PREPARATION OF SOLUTION II
(ILLUSTRATIVE EXAMPLE)

It is a matter of a measured amount of 50-70 weight % hydrogen peroxide solution which is approximately equivalent to the amount of soda and sodium metaborate in the solution I. The crystallization nuclei are those of sodium percarbonate or sodium perborate which either originate from other processes of production or result from the carrying out of the process of the invention, as e.g. cyclone dust and/or ground oversize particles. These latter also have simultaneously as nuclei a content of sodium percarbonate and sodium perborate, besides a certain amount of silicate and sodium hexametaphosphate.

As spraying units there have proven above all binary nozzles in which there is employed as driving gas an inert gas, the best being air.

The process can be carried out either discontinuously (batchwise) or continuously.

The technological advance of the process of the invention is that in a single operation there is obtained a per salt which is more readily soluble than perborate and has a higher active oxygen content than this possesses and whose stability against decomposition in moist air is considerably high. Furthermore, it is significant that in the stated limits a per salt can be obtained whose content of percarbonate and perborate is adjustable as desired. This is of significance in the later use in washing agents. A process of this type for at will adjusting a percarbonate-perborate content in one and the same product which besides has the above mentioned properties of the product was not previously known. This process also was not obvious, since those skilled in the art, as stated, assumed that an aqueous solution which simultaneously contains sodium percarbonate and sodium perborate could neither be produced nor manipulated because of the precipitation of the sodium perborate.

Unless otherwise indicated all parts and percentages are by weight.

The process can comprise, consist essentially of or consist of the stated steps with the materials set forth.

The invention will be explained further in connection with the following examples.

DETAILED DESCRIPTION

EXAMPLE 1

There were present in a rotating drum (diameter=250 mm, height=250 mm) having four equally spaced central flares (width=15 mm) and at an angle of inclination of 15° C. and rotating at a speed of 30 rpm, 700 grams of sodium percarbonate having a particle size of <0.4 mm.

In each case 1/5 of 520 grams of a solution (Solution I) which contains 5 grams of sodium hexametaphosphate, 102.1 grams of soda, 7.2 grams of sodium metaborate and 30.5 grams of waterglass solution of 38° Bé were mixed together homogeneously with 15 grams of hydrogen peroxide solution of 70 weight % $H_2O_2$ (Solution II). The thus produced spray solution in a first process step was sprayed through a binary nozzle on the particles present in the rotating drum.

The sprayed product was subsequently dried for about 1 hour at 55°-60° C. in a drying cabinet.

Process steps 2 to 5 were carried out in a manner corresponding to process of step 1, each time with 1/5 of the solution I.

EXAMPLE 2

As described in Example 1 there were present in a rotating drum at an angle of inclination of 15° and 30 rpm 700 grams of sodium percarbonate having a particle size of <0.4 mm.

In each case 1/5 of 559 grams of a solution (Solution I) which contains 5 grams of sodium hexametaphosphate, 90.7 grams of soda, 14.4 grams of sodium metaborate and 30.5 grams of water glass solution of 38° Bé were mixed together with 13.6 grams of hydrogen peroxide solution containing 70 weight % of $H_2O_2$ (Solution II) according to Example 1 before spray solution was sprayed in a first process type by a binary nozzle on the particles in the rotating drum.

The sprayed product was subsequently dried for about 1 hour at 55°-60° C. in a drying cabinet.

The process steps 2 to 5 were carried out according to process step 1.

EXAMPLE 3

As described in Example 1 there were present in a rotating drum under an angle of inclination of 15° and 30 rpm 700 grams of sodium percarbonate having a particle size of <0.4 mm.

In each case 1/5 of 545 grams of a solution (Solution I) which contains 5 grams of sodium hexametaphosphate, 88.9 grams of soda, 21.5 grams of sodium metaborate and 30.5 grams of waterglass solution of 38° Bé were mixed together with 15.4 grams of hydrogen peroxide solution containing 70 weight % hydrogen peroxide (Solution II) according to Example 1 before spraying. The thus produced spray solution in a first process step was sprayed through a binary nozzle on the particles in the rotating drum.

The sprayed product was subsequently dried for about 1 hour at 55°-60° C. in a drying cabinet.

Process steps 2 to 5 were carried out according to process step 1.

EXAMPLE 4

As described in Example 1 there were present in a rotating drum under an angle of inclination of 15° and 30 rpm 700 grams of sodium percarbonate having a particle size of <0.4 mm.

In each case 1/5 of 559 grams of a solution (Solution I) which contains 5 grams of sodium hexametaphosphate, 77.6 grams of soda, 28.7 grams of sodium metaborate and 30.5 grams of waterglass solution of 38° Bé were mixed together with 14.7 grams of hydrogen peroxide solution containing 70 weight % hydrogen peroxide (Solution II) according to example 1 before spraying. The thus produced spray solution in a first process step was sprayed through a binary nozzle on the particles in the rotating drum.

The sprayed product was subsequently dried for 1 hour at 55°-60° C. in a drying cabinet.

Process steps 2 to 5 were carried out according to process step 1.

TABLE 1

| | Starting Material | Product from Process of Production | | | |
|---|---|---|---|---|---|
| | | Example 1 Pc:Pb 9:1 | Example 2 Pc:Pb 8:2 | Example 3 Pc:Pb 7:3 | Example 4 Pc:Pb 6:4 |
| Active Oxygen (Oa) % | 13.68 | 13.68 | 13.56 | 13.66 | 13.66 |
| $Na_2O$ % | 37.51 | 37.20 | 37.20 | 37.28 | 37.20 |
| $B_2O_3$ % | — | 1.39 | 1.74 | 1.92 | 2.26 |
| $CO_2$ % | 27.10 | 26.20 | 26.00 | 25.60 | 25.40 |
| $SiO_2$ % | 0.01 | 0.80 | 0.82 | 0.79 | 0.81 |
| Time to Dissolve (minutes) | 0.5 | 1.55 | 1.30 | 1.55 | 2.10 |
| Bulk density kg/l | 0.91 | 0.79 | 0.78 | 0.81 | 0.81 |
| Sieve analysis on | | | | | |
| 0.8 mm % | 0 | 4 | 8 | 4 | 4 |
| 0.5 mm % | 0 | 55 | 66 | 62 | 61 |
| 0.4 mm % | 1 | 20 | 15 | 16 | 18 |
| 0.2 mm % | 70 | 21 | 11 | 18 | 17 |
| 0.1 mm % | 28 | 0 | 0 | 0 | 0 |
| Residue % | 1 | 0 | 0 | 0 | 0 |
| Decomposition of active oxygen after 10 days at 30° C. and 92.9% rel. humidity | 95.5 | 11.5 | 12.4 | 10.2 | 9.0 |
| Particle fraction employed mm as nuclei | <0.4 → 0.315 | <0.4 → 0.315 | <0.4 → 0.315 | <0.4 → 0.315 | <0.4 → 0.315 |

In Examples 1 to 4 different mixture ratios of sodium percarbonate and sodium perborate were specified. Under the term "sodium perborate" in this application there is meant, as is customary, the tetrahydrate.

With increasing content of sodium perborate to be used the solubility time increases but the stability in moist atmosphere also increases.

In Table 1
Pc=sodium percarbonate
Pb=sodium perborate tetrahydrate.

EXAMPLE 5

As described in Example 1 there were present in a rotating drum under an angle of inclination of 15° and 30 rpm 700 grams of per salt having a particle size of <0.4 mm.

In each case 1/5 of 559 grams of a solution (Solution I) which contains 5 grams of sodium hexametaphosphate, 90.7 grams of soda (sodium carbonate), 14.4 grams of soidum metaborate and 30.5 grams of waterglass solution of 38° Bé were mixed together with 13.6 grams of hydrogen peroxide solution containing 70 weight % hydrogen peroxide (Solution II) according to Example 1 before spraying. The thus produced spray solution in a first process step was sprayed through a binary nozzle on the particles in the rotating drum.

The sprayed product was subsequently dried for about 1 hour at 55°-60° C. in a drying cabinet.

Process steps 2 to 5 were carried out according to process step 1.

As can be ssen from Table 2 the composition of the final product, up to the content of $SiO_2$, scarecely differs from the nuclei initially present.

The entire disclosure of German priority application P 2940192.1 is hereby incorporated by reference.

TABLE 2

| | Starting Material | Test Product |
|---|---|---|
| Active oxygen % | 13.70 | 13.85 |
| $Na_2O$ % | 35.24 | 36.33 |
| $B_2O_3$ % | 5.66 | 5.12 |
| $CO_2$ % | 21.22 | 21.94 |
| $P_2O_5$ % | 1.82 | 1.92 |
| $SiO_2$ % | 1.02 | 2.92 |
| Solubility time (minutes) | 2.2 | 2.5 |
| Bulk Density kg/l | 0.82 | 0.78 |
| Sieve analysis on | | |
| 0.8 mm % | 0 | 4 |
| 0.5 mm % | 0 | 50 |
| 0.4 mm % | 1 | 25 |
| 0.2 mm % | 65 | 21 |
| 0.1 mm % | 33 | 0 |
| Residue % | 1 | 0 |
| Decomposition of active oxygen after 10 days at +30° C. and 92.9% rel. humidity | 12.0 | 8.5 |
| Particle fraction employed in mm as nuclei | <0.4 → 0.315 | <0.4 → 0.315 |

What is claimed is:

1. In a process for the production of a stable per salt which contains sodium percarbonate and sodium perborate by bringing together a crystallization nucleus with an aqueous solution and volatilization of the water, the improvement comprising bringing together crystallization nuclei containing (1) sodium percarbonate, (2) sodium perborate or (3) a mixture of sodium percarbonate and sodium perborate with an aqueous solution containing between 20–40 weight % of dissolved solids and which is supersaturated in both sodium percarbonate and sodium perborate and also contains sodium silicate and sodium hexametaphosphate and wherein based on the dissolved solid portion 5 to 60 weight % is sodium carbonate as $Na_2CO_3 \cdot 1.5H_2O$; 1 to 20 weight % is $B_2O_3$ as $NaBO_2 \cdot 3H_2O$; 0.05 to 5 weight % is $SiO_2$ as sodium silicate and 0.01 to 5 weight % is $P_2O_5$ as sodium hexametaphosphate, said aqueous solution having been prepared in two parts, one part being an aqueous solution of sodium carbonate, sodium borate, sodium silicate and sodium hexametaphosphate and the other part being an aqueous solution of hydrogen peroxide and then the two parts having been mixed together.

2. The process of claim 1 wherein the composition of the crystallization nuclei is practically identical with that of the solids in the aqueous solution.

3. The process of claim 2 wherein the aqueous solution is formed in situ from an aqueous mixture of sodium carbonate, hydrogen peroxide, sodium hexametaphosphate, borax, sodium hydroxide, and sodium silicate.

4. A process according to claim 1 wherein the aqueous solution is formed in situ from an aqueous mixture of sodium carbonate, hydrogen peroxide, sodium hexametaphosphate borax, sodium hydroxide, and sodium silicate.

5. A process according to claim 1 wherein the amount of hydrogen peroxide is about equal to the amount required for formation of both the sodium percarbonate and the sodium perborate.

6. A process according to claim 1 wherein the two parts are mixed by spraying to form a mixed solution.

* * * * *